United States Patent
Kim et al.

(10) Patent No.: US 12,092,762 B2
(45) Date of Patent: *Sep. 17, 2024

(54) LiDAR SENSING DEVICE

(71) Applicant: HYUNDAI MOBIS CO., LTD., Seoul (KR)

(72) Inventors: Won Gyum Kim, Yongin-si (KR); Young Shin Kim, Yongin-si (KR); Kyung Rin Kim, Yongin-si (KR); Sung Eun Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 117 days.

This patent is subject to a terminal disclaimer.

(21) Appl. No.: 17/372,486

(22) Filed: Jul. 11, 2021

(65) Prior Publication Data

US 2021/0333364 A1 Oct. 28, 2021

Related U.S. Application Data

(63) Continuation of application No. 16/458,190, filed on Jul. 1, 2019.

(30) Foreign Application Priority Data

Jul. 2, 2018 (KR) .......................... 10-2018-0076440

(51) Int. Cl.
*G01S 7/481* (2006.01)
*G01S 17/08* (2006.01)

(52) U.S. Cl.
CPC .......... *G01S 7/4813* (2013.01); *G01S 7/4814* (2013.01); *G01S 7/4817* (2013.01); *G01S 17/08* (2013.01)

(58) Field of Classification Search
CPC .... G01S 7/4813; G01S 7/4814; G01S 7/4817; G01S 17/08
(Continued)

(56) References Cited

U.S. PATENT DOCUMENTS 7,884,923 B2 * 2/2011 Kumagai .............. G01S 7/4814
356/5.01
8,836,922 B1 9/2014 Pennecot et al.
(Continued)

FOREIGN PATENT DOCUMENTS

CN 104237899 A 12/2014
CN 106940179 A 7/2017
(Continued)

OTHER PUBLICATIONS

Machine Translation of DE-10304187-A1 (Year: 2004).*
(Continued)

*Primary Examiner* — Luke D Ratcliffe
(74) *Attorney, Agent, or Firm* — NSIP Law

(57) ABSTRACT

A LiDAR sensing device including: a sensing light source unit configured to radiate sensing light; a light transmitting reflector configured to reflect the sensing light radiated from the sensing light source unit; a scanner unit configured to reflect the sensing light reflected from the light transmitting reflector into a target, and to reflect incident light reflected from the target; a light receiving lens configured to pass the incident light reflected from the scanner unit, and integrated with the light transmitting reflector; a light receiving reflector configured to reflect the incident light passing through the light receiving lens; and an optical detecting unit into which the incident light reflected from the light receiving reflector is incident.

6 Claims, 6 Drawing Sheets

(58) Field of Classification Search
USPC .......................................................... 356/4.01
See application file for complete search history.

(56) References Cited

U.S. PATENT DOCUMENTS

| | | | |
|---|---|---|---|
| 10,649,072 B2 * | 5/2020 | Bozchalooi | G01S 17/931 |
| 10,690,754 B2 * | 6/2020 | Pei | G01S 17/42 |
| 10,788,574 B2 * | 9/2020 | Shim | G02B 17/08 |
| 10,823,828 B2 | 11/2020 | Mori et al. | |
| 11,579,401 B2 * | 2/2023 | Jang | G01S 17/08 |
| 11,592,532 B2 * | 2/2023 | Choi | G01S 17/89 |
| 2006/0131486 A1 | 6/2006 | Land | |
| 2009/0002678 A1 * | 1/2009 | Tanaka | G02B 5/09 |
| | | | 356/4.01 |
| 2012/0169053 A1 | 7/2012 | Tchoryk et al. | |
| 2017/0102454 A1 | 4/2017 | Yuasa | |
| 2017/0168141 A1 | 6/2017 | Yuasa | |
| 2018/0156917 A1 * | 6/2018 | Gogolla | G01S 7/4814 |
| 2018/0188355 A1 | 7/2018 | Bao et al. | |
| 2018/0267151 A1 | 9/2018 | Hall et al. | |
| 2018/0275275 A1 * | 9/2018 | Lundquist | G01S 7/4817 |
| 2018/0284285 A1 | 10/2018 | Curatu | |
| 2019/0383939 A1 | 12/2019 | Mori et al. | |

FOREIGN PATENT DOCUMENTS

| | | | | |
|---|---|---|---|---|
| CN | 107037442 A | | 8/2017 | |
| DE | 10304187 A1 * | | 8/2004 | ........... G01C 15/002 |
| DE | 102013107695 A1 * | | 1/2015 | ............. G01S 17/42 |
| JP | 2010203820 A | | 9/2010 | |
| JP | 2012208058 A | | 10/2012 | |
| JP | 2013160769 A1 | | 8/2013 | |
| KR | 10-2015-0009177 | | 1/2015 | |
| KR | 10-2017-0135415 A | | 12/2017 | |
| KR | 20170135415 A | * | 12/2017 | ............ G01S 7/4811 |
| WO | WO-2017176410 A1 | * | 10/2017 | ........... G01C 15/002 |
| WO | 2018150998 A1 | | 8/2018 | |
| WO | 2018150999 A1 | | 8/2018 | |

OTHER PUBLICATIONS

Machine Translation of DE-102013107695-A1 (Year: 2015).*
Machine Translation of KR-20170135415-A (Year: 2017).*
Office Action dated Dec. 27, 2022 from the Korean Patent Office for Korean Patent Application No. 10-2018-0076440.
Non-Final Office Action mailed Dec. 12, 2022, in U.S. Appl. No. 16/458,190.
The Editors of Encyclopaedia Britannica, "Collimator", Jun. 25, 2012, Encyclopaedia Britannica (Year: 2012).
Final Office Action dated May 3, 2023, in U.S. Appl. No. 16/458,190.
Office Action dated Jun. 12, 2023 from the Korean Patent Office for Korean Patent Application No. 10-2018-0076440.
Office Action dated Jul. 14, 2023 from the Chinese Patent Office for Chinese Patent Application No. 2021110037619.

* cited by examiner

LiDAR SENSING DEVICE

CROSS-REFERENCES TO RELATED APPLICATION

This application is a continuation of U.S. patent application Ser. No. 16/458,190, filed on Jul. 1, 2019, which claims priority from and the benefit of Korean Patent Application No. 10-2018-0076440, filed on Jul. 2, 2018, each of which is hereby incorporated by reference for all purposes as if fully set forth herein.

BACKGROUND

Field

Exemplary embodiments relate to a LiDAR (Light Detection and Ranging) sensing device, and more particularly, to a LiDAR sensing device, which reduces a blockage area, thus improving light receiving efficiency and decreasing the number of components.

Discussion of the Background

As the technology of vehicles is developed, functions including autonomous driving as well as autonomous parking are required. In order to perform these functions, a need for a LiDAR sensor is increasing.

The LiDAR sensor is mounted on a bumper of a vehicle to detect the front and rear of the vehicle and thus detect an object, a structure or the like. The LiDAR sensor is installed in glass or a structure of a vehicle body. The LiDAR sensor uses light to detect a target.

The LiDAR sensor includes a transmitting optical system to transmit light, and a receiving optical system to receive incident light. The transmitting optical system includes a laser generator, a transmission barrel, a transmission lens and a transmission reflector, while the receiving optical system includes a reception lens, a reflecting mirror and a laser detector.

In a conventional LiDAR sensor, as light passing through the reception lens is reflected by the reflecting mirror, a focal length received by the detector is formed. The conventional LiDAR sensor is problematic in that the reflecting mirror is installed to turn an optical path and thereby reduce the size of the LiDAR sensor, so that the number of components is increased.

Further, since a blockage area where a part of a receiving area of the receiving optical system is blocked by the transmission barrel and the transmission reflector of the transmitting optical system is produced, the light receiving efficiency of the LiDAR sensor can be reduced.

Therefore, there is a need to overcome the above-described problems.

The related art of the present invention is disclosed in Korean Patent Laid-Open Publication No. 2015-0009177 registered on Jan. 26, 2015 and entitled "LiDAR Sensor System".

The above information disclosed in this Background section is only for understanding of the background of the inventive concepts, and, therefore, it may contain information that does not constitute prior art.

SUMMARY

Exemplary embodiments of the present invention are directed to a LiDAR sensing device, which reduces a blockage area, thus improving light receiving efficiency and decreasing the number of parts.

In one embodiment, a LiDAR sensing device may include: a sensing light source unit configured to radiate sensing light; a light transmitting reflector configured to reflect the sensing light radiated from the sensing light source unit; a scanner unit configured to reflect the sensing light reflected from the light transmitting reflector into a target, and to reflect incident light reflected from the target; a light receiving lens configured to pass the incident light reflected from the scanner unit, and integrated with the light transmitting reflector; a light receiving reflector configured to reflect the incident light passing through the light receiving lens; and an optical detecting unit into which the incident light reflected from the light receiving reflector is incident.

The sensing light source unit may be disposed to deviate from an optical path of the light receiving lens and the light receiving reflector.

The sensing light source unit may include a barrel disposed to deviate from the optical path of the light receiving lens; a light source provided in the barrel; and a light transmitting lens unit provided on an output side of the light source to collimate the sensing light radiated from the light source.

The light transmitting lens unit may include a first light transmitting lens provided in the barrel; and a second light transmitting lens provided in the barrel, the sensing light passing through the first light transmitting lens being incident into the second light transmitting lens.

The light transmitting lens unit may include: a first light transmitting lens provided in the barrel; and a second light transmitting lens integrated with the light receiving lens, the sensing light passing through the first light transmitting lens being incident into the second light transmitting lens.

The light transmitting reflector may be disposed in the optical path of the light receiving lens.

The scanner unit may include a scanner reflector configured to reflect the sensing light reflected from the light transmitting reflector towards the target, and to reflect the incident light reflected from the target into the light receiving lens; and a scanner driving part connected to the scanner reflector to rotate the scanner reflector.

The LiDAR sensing device may further include an interference filter provided between the light receiving reflector and the optical detecting unit.

In another embodiment, a LiDAR sensing device may include: a sensing light source unit configured to radiate sensing light; a scanner unit configured to reflect the sensing light radiated from the sensing light source unit into a target, and to reflect incident light reflected from the target; a light receiving lens configured to pass the incident light reflected from the scanner unit, and integrated with the sensing light source unit; a light receiving reflector configured to reflect the incident light passing through the light receiving lens; and an optical detecting unit into which the incident light reflected from the light receiving reflector is incident.

The sensing light source unit may be disposed in an optical path of the light receiving lens and the light receiving reflector.

The sensing light source unit may include a barrel disposed in the optical path of the light receiving lens and the light receiving reflector; a light source provided in the barrel; and a light transmitting lens unit disposed on an output side of the light source to collimate the sensing light radiated from the light source, and integrated with the light receiving lens.

The light transmitting lens unit may include a first light transmitting lens provided in the barrel; and a second light transmitting lens integrated with the light receiving lens, the sensing light passing through the first light transmitting lens being incident into the second light transmitting lens.

The light transmitting lens unit may include a first light transmitting lens integrated with the light receiving lens; and a second light transmitting lens integrated with the first light transmitting lens, the sensing light passing through the first light transmitting lens being incident into the second light transmitting lens.

The scanner unit may include a scanner reflector configured to reflect the sensing light reflected from the sensing light source unit towards the target, and to reflect the incident light reflected from the target into the light receiving lens; and a scanner driving part provided in the scanner reflector to rotate the scanner reflector.

The LiDAR sensing device may further include an interference filter provided between the light receiving reflector and the optical detecting unit.

According to the present invention, some of the receiving optical system and the transmitting optical system are integrated into one optical module, so that it is possible to reduce the number of the components of the LiDAR sensing device.

Furthermore, according to the present invention, since the size of the blockage area in the light receiving lens may be reduced, it is possible to increase the light receiving efficiency. As the light receiving efficiency increases, the maximum detection distance of the LiDAR sensing device can be further increased.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
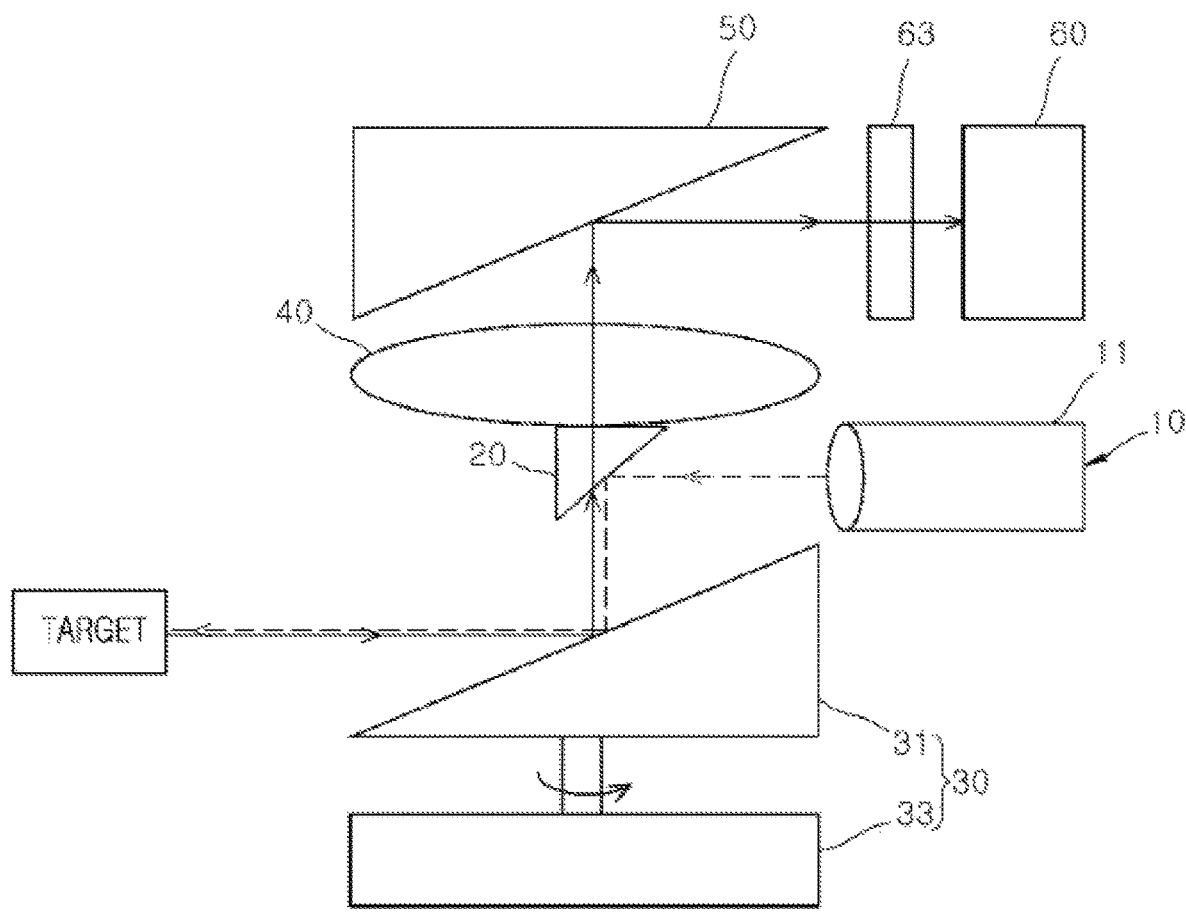
FIG. 1 is a diagram illustrating the configuration of a LiDAR sensing device in accordance with a first embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

First, a LiDAR sensing device in accordance with a first embodiment of the present invention will be described.

Figure 2:
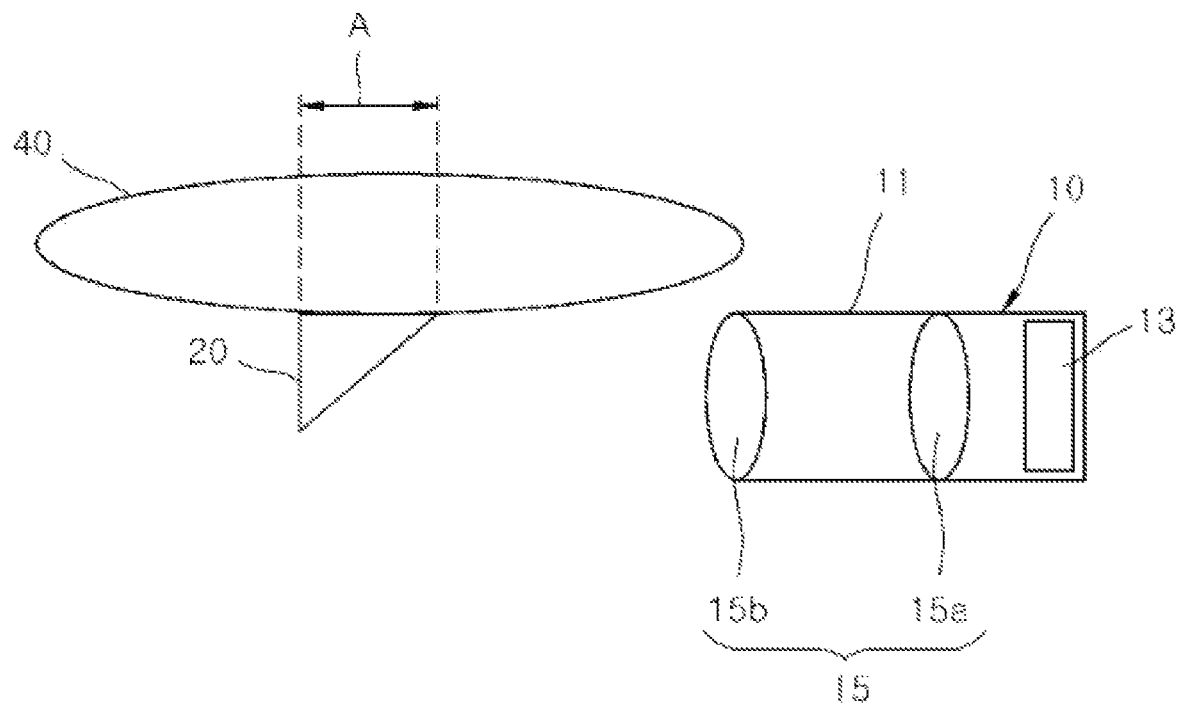
FIG. 2 is a diagram illustrating the configuration of a sensing light source unit, a light receiving lens and a light receiving reflector in the LiDAR sensing device in accordance with the first embodiment of the present invention.

FIG. 1 is a diagram illustrating the configuration of the LiDAR sensing device in accordance with the first embodiment of the present invention, and FIG. 2 is a diagram illustrating the configuration of a sensing light source unit, a light receiving lens and a light receiving reflector in the LiDAR sensing device in accordance with the first embodiment of the present invention.

Referring to FIGS. 1 and 2, the LiDAR sensing device in accordance with the first embodiment of the present invention includes a sensing light source unit 10, a light transmitting reflector 20, a scanner unit 30, a light receiving lens 40, a light receiving reflector 50 and an optical detecting unit 60.

The sensing light source unit 10 radiates sensing light. The sensing light source unit 10 is disposed to deviate from the optical path of the light receiving lens 40 and the light receiving reflector 50. Since the sensing light source unit 10 is disposed to deviate from the optical path of the light receiving lens 40 and the light receiving reflector 50, it is possible to prevent the sensing light source unit 10 from blocking incident light in the optical path.

Thus, since it is possible to prevent a blockage area A from being created by the sensing light source unit 10 in the optical path of the light receiving lens 40, light receiving efficiency can be improved. As the light receiving efficiency is improved, the maximum detection distance of the LiDAR sensing device can be increased.

The sensing light source unit 10 includes a barrel 11, a light source 13 and a light transmitting lens unit 15.

The barrel 11 is disposed to deviate from the optical path of the light receiving lens 40. The barrel 11 may be formed in a cylindrical shape. The light source 13 is installed in the barrel 11. The light transmitting lens unit 15 is provided on an output side of the light source 13 to collimate the sensing light radiated from the light source 13. Since the light transmitting lens unit 15 collimates the sensing light into parallel rays, the output of the sensing light can be improved.

The light transmitting lens unit 15 includes a first light transmitting lens 15a and a second light transmitting lens 15b. The first light transmitting lens 15a is installed in the barrel 11. The second light transmitting lens 15b is installed in the barrel 11, and sensing light passing through the first light transmitting lens 15a is incident on the second light transmitting lens 15b. Since the first light transmitting lens 15a and the second light transmitting lens 15b are installed in the barrel 11, it is possible to prevent the first light transmitting lens 15a and the second light transmitting lens 15b from creating the blockage area A of the light receiving lens 40.

The light transmitting reflector 20 reflects the sensing light radiated from the sensing light source unit 10. The light transmitting reflector 20 may be coated with a metallic reflection layer (not shown) to improve light reflection efficiency.

The light transmitting reflector 20 is disposed in the optical path of the light receiving lens 40. Here, since the light transmitting reflector 20 is disposed in the optical path of the light receiving lens 40, the blockage area A corresponding to a width of the light transmitting reflector 20 is created. Thus, since the blockage area A is reduced in the light receiving lens 40, the light receiving efficiency can be improved. As the light receiving efficiency is improved, the maximum detection distance of the LiDAR sensing device can be further increased.

The scanner unit 30 reflects the sensing light reflected from the light transmitting reflector 20 into a target, and then reflects the incident light reflected from the target. A reflection layer is formed on the scanner unit 30 to improve the light reflection efficiency.

The scanner unit 30 includes a scanner reflector 31 and a scanner driving part 33. The scanner reflector 31 reflects the sensing light reflected from the light transmitting reflector 20 towards the target, and the incident light reflected from the target is reflected into the light receiving lens 40. The scanner driving part 33 is connected to the scanner reflector 31 to rotate the scanner reflector 31. Since the scanner driving part 33 rotates the scanner reflector 31, the reflection angles of the sensing light and the incident light may be changed depending on the angle of the scanner reflector 31.

A motor unit may be applied to the scanner driving part 33. The motor unit may include an encoder (not shown) or be connected with the encoder. The encoder measures the rotation number, the rotation speed and the rotation angle of the motor unit to give the measured values to a control unit.

The incident light reflected from the scanner unit 30 passes through the light receiving lens 40.

The light receiving lens 40 may be integrated with the light transmitting reflector 20. The light receiving lens 40 and the light transmitting reflector 20 may be fabricated from the same optical material, such as crystal, glass, or transparent synthetic resin. An anti-reflective coating layer may be formed on the light receiving lens 40 to prevent the incident light from being reflected.

Since the light receiving lens 40 and the light transmitting reflector 20 are integrated into one optical module, it is possible to decrease the number of the components. Furthermore, it is possible to prevent the blockage area A from being created by the barrel 11.

The light receiving reflector 50 reflects the incident light passing through the light receiving lens 40. A reflection layer (not shown) is formed on the light receiving reflector 50 to improve the light reflection efficiency.

The incident light reflected from the light receiving reflector 50 is incident into the optical detecting unit 60. As the incident light is incident into the optical detecting unit 60, it is possible to detect the position and distance of the target.

The LiDAR sensing device further includes an interference filter 63 installed between the light receiving reflector 50 and the optical detecting unit 60. The interference filter 63 filters light of a specific wavelength. Since the interference filter 63 causes light of a certain wavelength range to be incident into the optical detecting unit 60, the optical detecting unit 60 may precisely detect the position and distance of the target.

Next, a LiDAR sensing device in accordance with a second embodiment of the present invention will be described. Since the second embodiment is substantially equal to the first embodiment except for the sensing light source unit, components common to both the embodiments will carry the same reference numerals and the duplicated description thereof will be omitted herein.

Figure 3:
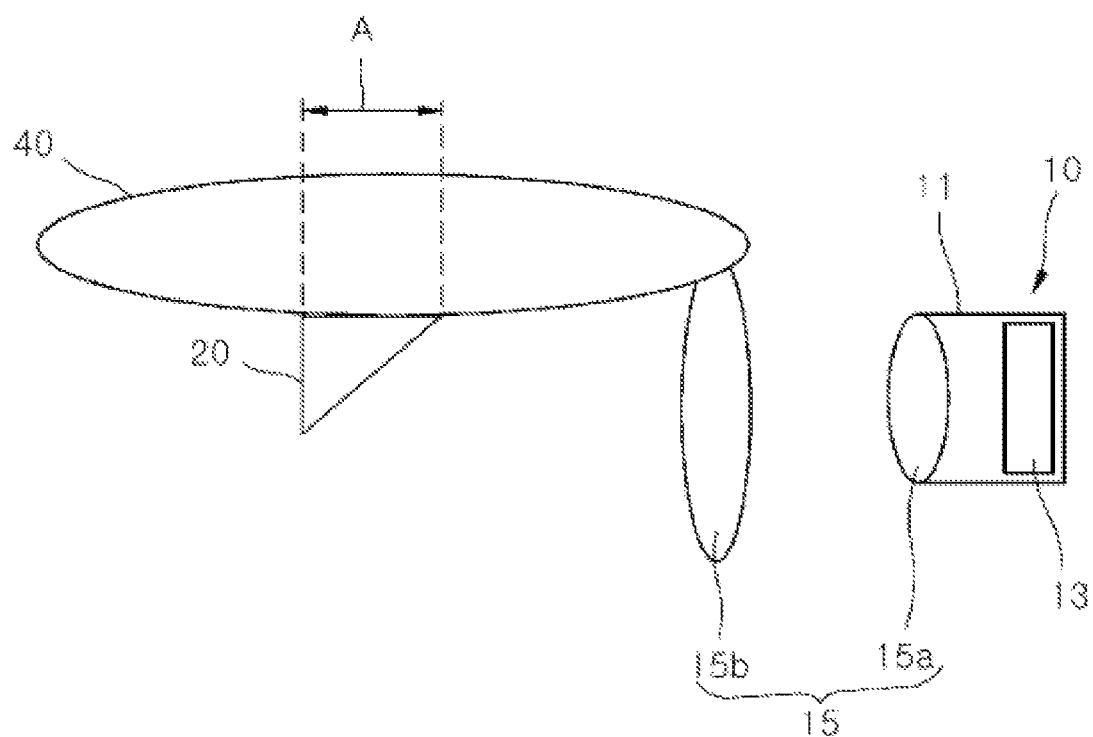
FIG. 3 is a diagram illustrating the configuration of a sensing light source unit, a light receiving lens and a light receiving reflector in a LiDAR sensing device in accordance with a second embodiment of the present invention.

FIG. 3 is a diagram illustrating the configuration of a sensing light source unit, a light receiving lens and a light receiving reflector in the LiDAR sensing device in accordance with the second embodiment of the present invention.

Referring to FIG. 3, the sensing light source unit 10 in accordance with the second embodiment of the present invention includes a barrel 11, a light source 13 and a light transmitting lens unit 15.

The barrel 11 is disposed to deviate from the optical path of the light receiving lens 40. The barrel 11 may be formed in a cylindrical shape. The light source 13 is installed in the barrel 11. The light transmitting lens unit 15 is provided on an output side of the light source 13 to collimate the sensing light radiated from the light source 13. Since the light transmitting lens unit 15 collimates the sensing light into parallel rays, the output of the sensing light can be improved.

The light transmitting lens unit 15 includes a first light transmitting lens 15a and a second light transmitting lens 15b.

At least one first light transmitting lens 15a is installed in the barrel 11. The first light transmitting lens 15a is made of an optical material such as crystal, glass or transparent synthetic resin.

The second light transmitting lens 15b is integrated with the light receiving lens 40. At least one second light transmitting lens is installed to cause the sensing light passing through the first light transmitting lens 15a to be incident therein. Furthermore, the light receiving lens 40 and the light transmitting reflector 20 are integrated with each other. The second light transmitting lens 15b, the light receiving lens 40 and the light transmitting reflector 20 may be fabricated from the same optical material, such as crystal, glass, or transparent synthetic resin. Since the second light transmitting lens 15b, the light receiving lens 40 and the light transmitting reflector 20 are integrated into one optical module, it is possible to decrease the number of the components of the LiDAR sensing device. Furthermore, it is possible to prevent the blockage area A from being created by the barrel 11.

Next, a LiDAR sensing device in accordance with a third embodiment of the present invention will be described.

Figure 4:
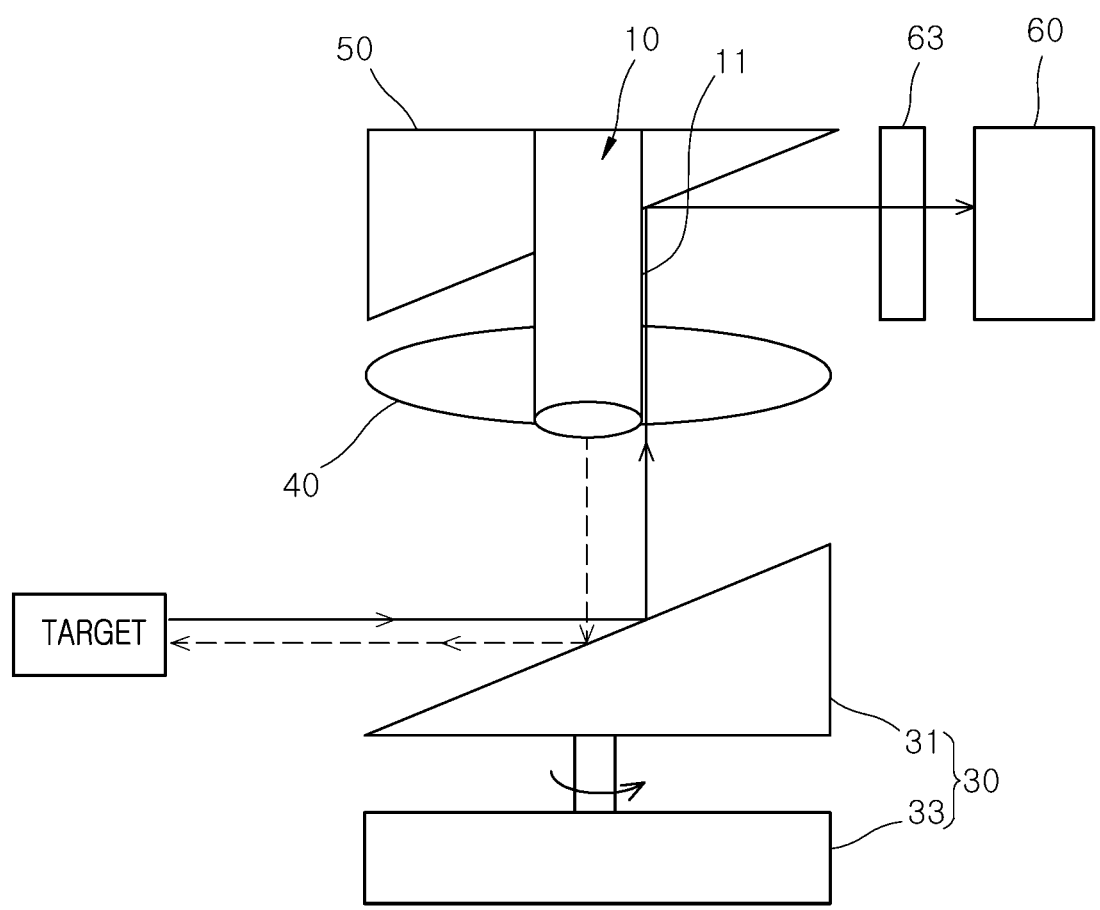
FIG. 4 is a diagram illustrating the configuration of a LiDAR sensing device in accordance with a third embodiment of the present invention.
Figure 5:
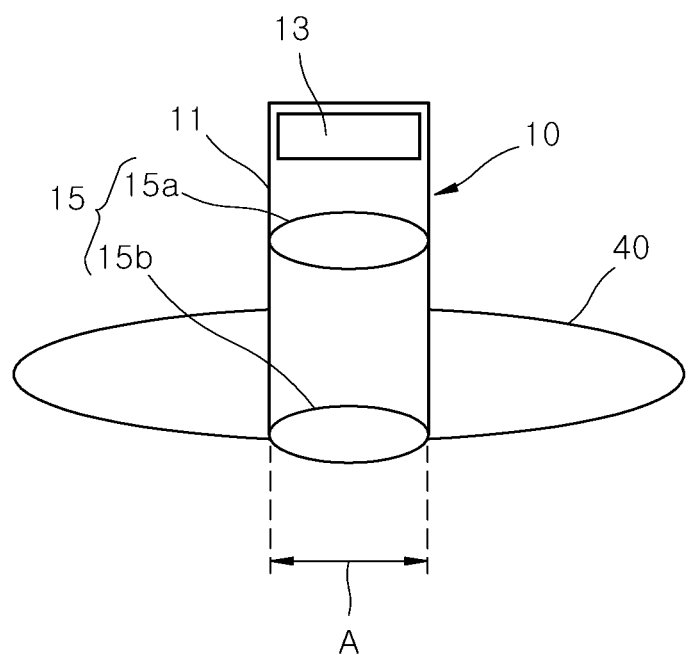
FIG. 5 is a diagram illustrating the configuration of a sensing light source unit, a light receiving lens and a light receiving reflector in the LiDAR sensing device in accordance with the third embodiment of the present invention.

FIG. 4 is a diagram illustrating the configuration of the LiDAR sensing device in accordance with the third embodiment of the present invention, and FIG. 5 is a diagram illustrating the configuration of a sensing light source unit, a light receiving lens and a light receiving reflector in the LiDAR sensing device in accordance with the third embodiment of the present invention.

Referring to FIGS. 4 and 5, the LiDAR sensing device in accordance with the third embodiment of the present invention includes a sensing light source unit 10, a scanner unit 30, a light receiving lens 40, a light receiving reflector 50 and an optical detecting unit 60.

The sensing light source unit 10 radiates sensing light. The sensing light source unit 10 is disposed in the optical path of the light receiving lens 40 and the light receiving reflector 50. Thus, since the sensing light source unit 10 creates the blockage area A of the light receiving lens 40 and the light receiving reflector 50, it is possible to reduce the size of the blockage area A. Thus, since the blockage area A in the light receiving lens 40 is reduced, it is possible to improve light receiving efficiency. As the light receiving efficiency is improved, the maximum detection distance of the LiDAR sensing device may be further increased.

Since the sensing light source unit 10 is disposed on the optical path of the light receiving lens 40, it is unnecessary to install the light transmitting reflector that reflects the sensing light radiated from the sensing light source unit 10 towards the scanner unit 30. Thus, the number of the components of the LiDAR sensing device can be reduced.

The sensing light source unit 10 includes a barrel 11, a light source 13 and a light transmitting lens unit 15.

The barrel 11 is disposed in the optical path of the light receiving lens 40 and the light receiving reflector 50. The barrel 11 may be formed in a cylindrical shape. The light source 13 is installed in the barrel 11.

The light transmitting lens unit 15 may be provided on an output side of the light source 13 to collimate the sensing light radiated from the light source 13, and may be integrated with the light receiving lens 40. Since the light transmitting lens unit 15 collimates the sensing light into parallel rays, the output of the sensing light can be improved. Furthermore, since the light transmitting lens unit 15 and the light receiving lens 40 are integrated with each other and the installation of the light transmitting reflector is omitted, the number of the components of the LiDAR sensing device can be decreased.

The light transmitting lens unit 15 includes a first light transmitting lens 15a and a second light transmitting lens 15b. The first light transmitting lens 15a is installed in the barrel 11. The second light transmitting lens 15b is integrated with the light receiving lens 40, and the sensing light passing through the first light transmitting lens 15a is incident into the second light transmitting lens 15b. Since the second light transmitting lens 15b is integrated with the light receiving lens 40, the number of the components of the LiDAR sensing device can be decreased.

The scanner unit 30 reflects the sensing light radiated from the sensing light source unit 10 into a target, and then reflects the incident light reflected from the target. A reflection layer is formed on the scanner unit 30 to improve the light reflection efficiency. Since the sensing light radiated from the sensing light source unit 10 is incident into the scanner unit 30, it is unnecessary to install the light transmitting reflector that reflects the sensing light towards the scanner unit 30. Thus, the number of the components of the LiDAR sensing device can be reduced.

The scanner unit 30 includes a scanner reflector 31 and a scanner driving part 33. The scanner reflector 31 reflects the sensing light reflected from the sensing light source unit 10 towards the target, and the incident light reflected from the target is reflected into the light receiving lens 40. The scanner driving part 33 is connected to the scanner reflector 31 to rotate the scanner reflector 31. Since the scanner driving part 33 rotates the scanner reflector 31, the reflection angles of the sensing light and the incident light may be changed depending on the angle of the scanner reflector 31.

A motor unit may be applied to the scanner driving part 33. The motor unit may include an encoder (not shown) or be connected with the encoder. The encoder measures the rotation number, the rotation speed and the rotation angle of the motor unit to give the measured values to a control unit.

The light receiving lens 40 passes the incident light reflected from the scanner unit 30, and is integrated with the sensing light source unit 10. The light receiving lens 40 may be fabricated from an optical material, such as crystal, glass, or transparent synthetic resin. An anti-reflective coating layer may be formed on the light receiving lens 40 to prevent the incident light from being reflected. Since the light receiving lens 40 and the sensing light source unit 10 are integrated into one optical module, it is possible to decrease the number of the components. Furthermore, the blockage area A can be reduced.

The light receiving reflector 50 reflects the incident light passing through the light receiving lens 40. A reflection layer is also formed on the scanner unit 30 to improve the light reflection efficiency.

The incident light reflected from the light receiving reflector 50 is incident into the optical detecting unit 60. As the incident light is incident into the optical detecting unit 60, it is possible to detect the position and distance of the target.

The LiDAR sensing device further includes an interference filter 63 installed between the light receiving reflector 50 and the optical detecting unit 60. The interference filter 63 filters light of a specific wavelength. Since the interference filter 63 causes light of a certain wavelength range to be incident into the optical detecting unit 60, the optical detecting unit 60 may precisely detect the position and distance of the target.

Next, a LiDAR sensing device in accordance with a fourth embodiment of the present invention will be described. Since the fourth embodiment is substantially equal to the third embodiment except for the light transmitting lens unit and the light receiving lens, components common to both the embodiments will carry the same reference numerals and the duplicated description thereof will be omitted herein.

Figure 6:
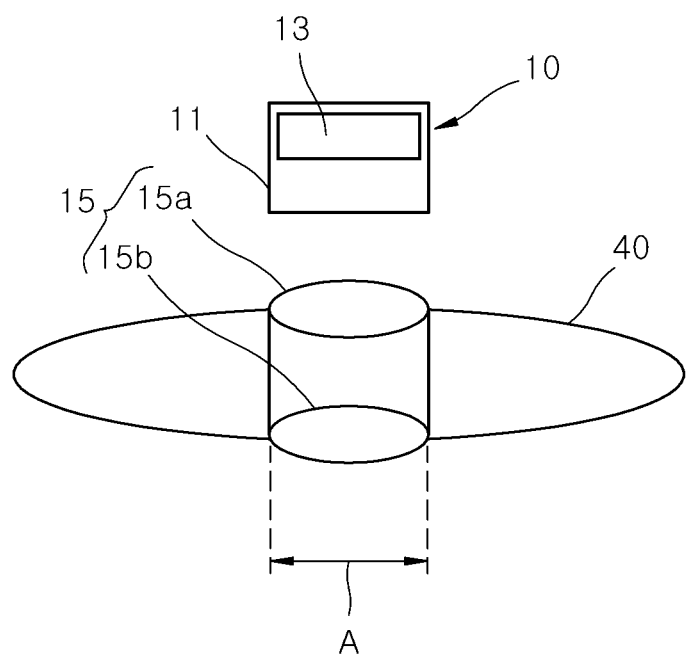
FIG. 6 is a diagram illustrating the configuration of a sensing light source unit, a light receiving lens and a light receiving reflector in a LiDAR sensing device in accordance with a fourth embodiment of the present invention.

FIG. 6 is a diagram illustrating the configuration of a sensing light source unit, a light receiving lens and a light receiving reflector in a LiDAR sensing device in accordance with a fourth embodiment of the present invention.

Referring to FIG. 6, a sensing light source unit 10 in accordance with the fourth embodiment of the present invention includes a barrel 11, a light source 13 and a light transmitting lens unit 15.

The barrel 11 is disposed in the optical path of the light receiving lens 40 and the light receiving reflector 50. The barrel 11 may be formed in a cylindrical shape. The light source 13 is installed in the barrel 11.

The light transmitting lens unit 15 is disposed on an output side of the light source 13 to collimate the sensing light radiated from the light source 13, and is integrated with the light receiving lens 40. Since the light transmitting lens unit 15 collimates the sensing light into parallel rays, the output of the sensing light can be improved. Furthermore, since the light transmitting lens unit 15 and the light receiving lens 40 are integrated with each other, the number of the components of the LiDAR sensing device can be reduced.

The light transmitting lens unit 15 includes a first light transmitting lens 15a and a second light transmitting lens 15b.

The first light transmitting lens 15a is integrated with the light receiving lens 40. The first light transmitting lens 15a is made of an optical material, such as crystal, glass or transparent synthetic resin. Since the first light transmitting lens 15a is integrated with the light receiving lens 40, the number of the components of the LiDAR sensing device can be reduced.

The sensing light passing through the first light transmitting lens 15a is incident into the second light transmitting lens 15b, and the second light transmitting lens is integrated with the light receiving lens 40. The second light transmitting lens 15b, the first light transmitting lens 15a and the light receiving lens 40 may be fabricated from the same optical material, such as crystal, glass, or transparent synthetic resin. Since the light receiving lens 40, the first light transmitting lens 15a and the second light transmitting lens 15b are integrated into one optical module, it is possible to decrease the number of the components of the LiDAR sensing device. Furthermore, the size of the blockage area A can be reduced.

According to the present invention, some of the receiving optical system and the transmitting optical system are integrated into one optical module, so that it is possible to reduce the number of the components of the LiDAR sensing device.

Furthermore, according to the present invention, since the size of the blockage area A in the light receiving lens 40 may be reduced, it is possible to increase the light receiving efficiency. As the light receiving efficiency increases, the maximum detection distance of the LiDAR sensing device can be further increased.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A Light Detection and Ranging (LiDAR) sensing device, comprising:
    a sensing light source configured to radiate sensing light;
    a light transmitting reflector configured to reflect the sensing light radiated from the sensing light source;
    a scanner configured to reflect the sensing light reflected from the light transmitting reflector into a target, and to reflect incident light reflected from the target;
    a light receiving lens configured to pass the incident light reflected from the scanner;
    a light receiving reflector configured to reflect the incident light passing through the light receiving lens; and
    an optical detector into which the incident light reflected from the light receiving reflector is incident,
    wherein:
    the light transmitting reflector is disposed such that a blockage area having a size corresponding to a size of the light transmitting reflector is formed in the incident light detected by the optical detector;
    the sensing light source comprises:
        a barrel disposed to deviate from the optical path of the light receiving lens;
        a light source provided in the barrel; and
        a light transmitting lens provided on an output side of the light source to collimate the sensing light radiated from the light source; and
    the light transmitting lens comprises:
        a first light transmitting lens provided in the barrel; and
        a second light transmitting lens integrated with the light receiving lens, the sensing light passing through the first light transmitting lens being incident into the second light transmitting lens.

2. The LiDAR sensing device of claim 1, wherein a size of the blockage area corresponds to a width of the light transmitting reflector perpendicular to a traveling direction of the incident light reflected from the scanner.

3. The LiDAR sensing device of claim 1, wherein a size of the blockage area is independent of a shape of the sensing light source.

4. A Light Detection and Ranging (LiDAR) sensing device, comprising:
    a sensing light source configured to radiate sensing light;
    a light transmitting reflector configured to reflect the sensing light radiated from the sensing light source;
    a scanner configured to reflect the sensing light reflected from the light transmitting reflector into a target, and to reflect incident light reflected from the target;
    a light receiving lens configured to pass the incident light reflected from the scanner;
    a light receiving reflector configured to reflect the incident light passing through the light receiving lens; and
    an optical detector into which the incident light reflected from the light receiving reflector is incident,
    wherein:
    the sensing light source comprises:
        a barrel disposed to form a blockage area corresponding to a size of the sensing light source in the incident light detected by the optical detector;
        a light source provided in the barrel; and
        a light transmitting lens provided on an output side of the light source to collimate the sensing light radiated from the light source; and
    the light transmitting lens comprises:
        a first light transmitting lens provided in the barrel; and
        a second light transmitting lens integrated with the light receiving lens, the sensing light passing through the first light transmitting lens being incident into the second light transmitting lens.

5. The LiDAR sensing device of claim 4, wherein the size of the blockage area corresponds to a width of the sensing light source perpendicular to a traveling direction of the incident light reflected from the scanner.

6. The LiDAR sensing device of claim 4, wherein the light source unit extends in at least one of the light receiving reflector and the light receiving lens so as to be parallel to a traveling direction of the incident light reflected from the scanner.

* * * * *